United States Patent
Hindermann et al.

(10) Patent No.: US 9,051,998 B2
(45) Date of Patent: Jun. 9, 2015

(54) ACTUATOR

(71) Applicant: SIEMENS AKTIENGESELLSCHAFT, München (DE)

(72) Inventors: Jörg Hindermann, Richterswil (CH); Andreas Pally, Allenwinden (CH)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/504,219

(22) Filed: Oct. 1, 2014

(65) Prior Publication Data

US 2015/0013485 A1    Jan. 15, 2015

Related U.S. Application Data

(62) Division of application No. 13/530,850, filed on Jun. 22, 2012.

(30) Foreign Application Priority Data

Jun. 22, 2011    (EP) .................................... 11171098
Jul. 12, 2011    (EP) .................................... 11173665

(51) Int. Cl.
*F16H 57/00*    (2012.01)
*F16H 19/08*    (2006.01)
(Continued)

(52) U.S. Cl.
CPC ........... *F16H 19/08* (2013.01); *Y10T 74/19614* (2015.01); *F16H 35/00* (2013.01); *F16K 31/047* (2013.01); *F16H 37/122* (2013.01); *Y10T 74/188* (2015.01)

(58) Field of Classification Search
CPC ....... F16H 25/04; F16H 25/12; F16H 25/125; F16H 37/122; F16H 19/08; F16K 31/02; F16K 31/04; F16K 31/043; F16K 31/047; F16K 31/05; F16K 31/055

USPC ................ 74/405, 412 R, 413, 421 A, 421 R; 251/66, 74, 129.01, 129.02, 129.11, 251/248, 251

See application file for complete search history.

(56) References Cited

U.S. PATENT DOCUMENTS 4,538,789 A * 9/1985 An ............................ 251/129.12
4,690,119 A * 9/1987 Makino et al. ........... 123/568.23
(Continued)

FOREIGN PATENT DOCUMENTS

CN        1211695 A      3/1999
DE      1 750 606        2/1971
(Continued)

OTHER PUBLICATIONS

Office Action mailed Mar. 4, 2014 in corresponding Chinese Application No. 201210207064.X.
(Continued)

*Primary Examiner* — Justin Krause
(74) *Attorney, Agent, or Firm* — Staas & Halsey LLP (57) ABSTRACT

A motor and a gear unit form an actuator. The gear unit is fitted with at least two mutually movable gear parts, acted on by a spring that counteracts their movement out of an idle state. The gear unit is fitted with at least one manual actuator that when actuated switches the motor off, disengages two mutually interacting gear wheels of the at least two gear parts and forces the at least two gear parts into the idle state. When the motor moves the gear parts out of the idle state during operation to an operating point, a cam plate on a first gear part is contacted by a sensor element on a second gear part, and the spring acts on the first and second gear parts during the movement out of the idle state in accordance with a position on the cam plate of the sensor element.

20 Claims, 7 Drawing Sheets

(51) Int. Cl.
*F16K 31/04* (2006.01)
*F16H 37/12* (2006.01)
*F16H 35/00* (2006.01)

(56) References Cited

U.S. PATENT DOCUMENTS

| | | | |
|---|---|---|---|
| 6,085,607 A | | 7/2000 | Narita et al. |
| 6,102,016 A | * | 8/2000 | Sitar et al. ................. 123/568.23 |
| 7,252,618 B2 | | 8/2007 | Spakowski et al. |
| 2002/0139950 A1 | * | 10/2002 | Lanz et al. ............... 251/129.11 |
| 2010/0102260 A1 | * | 4/2010 | Querio ..................... 251/129.11 |

FOREIGN PATENT DOCUMENTS

| | | |
|---|---|---|
| DE | 1750606 B2 | 12/1974 |
| DE | 198 38 146 A1 | 3/1999 |
| EP | 1 647 698 A2 | 4/2006 |
| EP | 11171098 | 6/2011 |
| EP | 11173665 | 7/2011 |
| GB | 1229626 | 4/1971 |
| JP | 11-213824 | 8/1999 |

OTHER PUBLICATIONS

Office Action in U.S. Appl. No. 13/530,850 dated Jun. 30, 2014.
U.S. Appl. No. 13/530,850, filed Jun. 22, 2012, Markus Bretz et al., Siemens Aktiengsellschaft.
Office Action for co-pending U.S. Appl. No. 13/530,850 mailed Nov. 6, 2014.
Office Action for co-pending U.S. Appl. No. 13/530,850 issued Feb. 24, 2015.

\* cited by examiner

FIG 12 and# ACTUATOR

CROSS REFERENCE TO RELATED APPLICATIONS

This application is divisional application of U.S. Ser. No. 13/530,850, filed Jun. 22, 2012, which is based on and claims priority to European Application No. 11171098 filed Jun. 22, 2011, and European Application No. 11173665 filed on Jul. 12, 2011, the contents of all three applications are hereby incorporated by reference.

BACKGROUND

Described below is an actuator fitted with a motor, a gear unit and an adjustment connection. Such actuators are for example used on valves or butterfly valves in systems for heating, ventilating and cooling buildings. For this and similar purposes the actuators must be reliable, durable and inexpensive, in particular with no expensive components, and capable of being manufactured in large volumes. With the growing importance of wireless control, low-energy operation is also a requirement in the absence of an external power supply. Because of this and in order to protect motor and drive train, such actuators must be switched off or throttled quickly, reliably, with low power and smoothly on reaching a final position or another position to be controlled. The same applies in the case of unexpectedly large loadings in the process of this, for example because of wear and tear to the object to be actuated or because of a foreign body therein. In the case of suitable electric motors, for example synchronous motors or brushless DC motors, damage and a reduction in their service life ensue when they reach their peak-load torque, in particular if they are not switched off quickly.

Because of this the gear unit is fitted with at least two mutually movable gear parts, as well as a spring acting on two of these that counteracts their movement out of an idle state. Flexible springs or torsion springs are standard. Spiral springs are highly suitable, especially in the case of linear motion. The gear unit is designed such that in the event of a blocked adjustment connection the motor moves the gear parts out of the idle state during operation to an operating point where, depending on the application, the motor is switched off, or else run in the opposite direction, or else in the case of a unidirectional motor is throttled in order to retain the position counter to the action of a return spring.

In many such actuators, once the motor is switched off the spring effect sometimes results in the gear parts moving backward and the motor being switched on again. A similar thing can happen when the motor power is throttled. If the actuator starts to splutter, the resulting vibrations can damage the motor, even though its peak-load torque is avoided. An electronic system to reliably prevent this problem requires components that are too expensive for the typical applications.

Other such actuators are marketed under the Siemens brand with type designations SQS or SQX. They are based on the principle of planetary gearing. Part of the gear train is mounted in a separate, pivotable housing. This is held in a defined center position by a torsion spring. When a final position is reached the adjustment connection is blocked and the pivotable housing pivots out of the center position despite torsion of the torsion spring. A cam embodied on the pivotable housing then strikes a switching contact, which interrupts the power supply to the electric motor and thus switches the drive off. The same happens if for another reason a particular toque is exceeded. The electric motor has been selected such that under normal conditions, taking account of manufacturing tolerances, the torsion spring cannot unlock it when standing idle. Thus normally the pivotable housing does not return immediately to the central position, which would switch the electric motor on again and thus make the actuator start spluttering. Only after a new movement command in the opposite direction does the pivotable housing move back to its center position.

Further such known actuators have a similar structure, whereby instead of a torsion spring a flexible spring attempts to hold a pivotable gear part in a center position. The flexible spring is centrally mounted and engages in a recess at the front end of the pivotable housing.

SUMMARY

The actuator's design is based on the insight that it is possible to significantly improve and reduce the cost of such actuators using a simple mechanical arrangement.

Accordingly the gear unit is designed such that during movement out of the idle state the extent to which the movement is counteracted reduces as from a particular point upstream of the operating point, such as a particular second point upstream of the operating point, to less than 60% of its maximum value, optionally even at a particular third point upstream of the operating point to zero. The extent to which the movement is counteracted corresponds in the case of an axial displacement to an effective force, for example in a worm gear, or else in the case of a rotation to a torque. Following an increase typical of a spring initially, the extent to which the movement is counteracted is reduced over a section compared to previous maximum values, and for example tends to decrease with every further movement. Thanks to simple measures a smaller and disproportionately cheap motor can reliably perform the tasks with a reduction to approximately 60%.

In an embodiment the spring is a flexible spring, and the extent to which it is counteracted can be influenced during bending, for example by moving the contact point along the length of the spring or by interacting with a cam plate.

The reduction in the counteraction is effected for example by a compensating effect in the direction of movement by a separate holding mechanism, in particular by a snap-in cam on the first gear part and a snap-in element on the second. In this case the snap-in element is designed such that its grip on the snap-in cam can be released merely by spring and motor together. Thus the snap-in cam is not freed from the motor until the latter is activated in the opposite direction and the actuator cannot start spluttering.

However, in an embodiment the first gear part is at least fitted with a cam plate, the second gear part is at least fitted with a sensor element for the cam plate, and during movement out of the idle state the spring acts on the gear parts, according to the position on the cam plate of the sensor element. The spring may act on the gear parts by a sensor element and cam plate, and the cam plate contains at least one ramp, on which a maximum counteraction by the spring results. Advantageously the cam plate contains at least one spring-neutral path close to the ramp, on which no counteraction by the spring results. The sensor element is for example attached to the end of a flexible spring, or is even an integral component there, created in particular by bending the flexible spring.

In a further embodiment the gear unit is fitted with a pretensioning element which is suitable for adjusting the counteraction by the spring. In particular in the case of a flexible spring this can be easily effected. The pretensioning element may be suitable for differently adjusting the counteraction by the spring for the different directions of movement out of the idle state.

In a further embodiment the gear unit is designed such that during the movement out of the idle state it switches the motor off at the operating point. For example, the gear parts are for this purpose fitted at least with a switch or a cam respectively.

In a further embodiment one of the two gear parts is fitted with a gear wheel that is fitted with at least one release cam, the other gear part is fitted with at least one release element, and release cam and release element touch one another when they move out of the idle state in the vicinity of an operating point. The release cam and release element may be designed such that if the gear wheel is rotating in a different direction a release cam strikes a beveled, or perpendicular, contact area of the release element. To this end for example the release element has asymmetrically a perpendicular contact area for the release cam from one direction of rotation and a beveled contact area for it from the other direction of rotation.

In a further embodiment the gear unit is fitted with at least one manual actuator, and the gear unit is designed such that it switches the motor off when the manual actuator is actuated, disengages two mutually interacting gear wheels of the first and second gear parts and where appropriate forces the gear parts into the idle state.

BRIEF DESCRIPTION OF THE DRAWINGS

These and other aspects and advantages will become more apparent and more readily appreciated from the following description of an exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Figure 1:
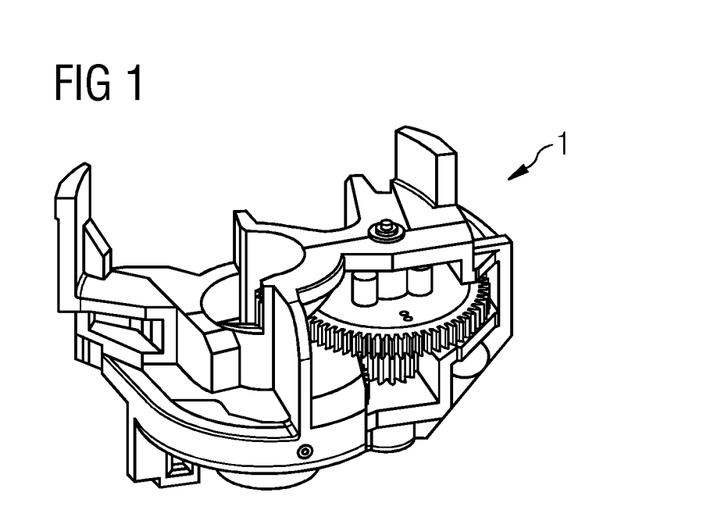
FIG. 1 is a perspective view that schematically shows a pivotable gear part of the actuator.

FIG. 1 shows a first, pivotable gear part 1.

Figure 2:
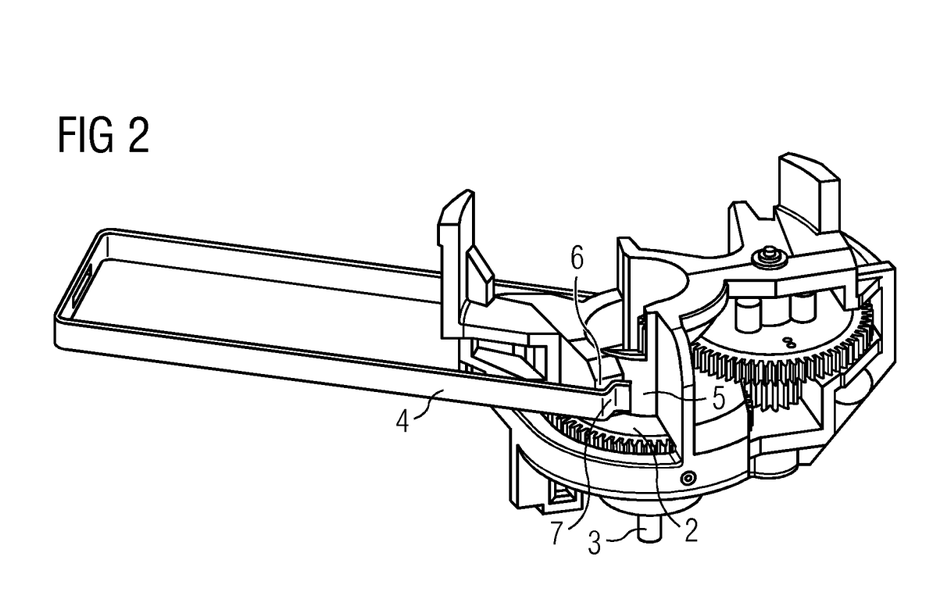
FIG. 2 is a perspective view that schematically shows the pivotable gear part according to FIG. 1, as well as gear wheel elements connected thereto on the output side and a flexible spring.

In FIG. 2 a gear wheel 2 and its axis of rotation 3 are arranged inside the pivotable gear part, and belong to a second gear part. The pivotable gear part pivots about the axis with which the axis of rotation 3 is aligned. A U-shaped flexible spring 4 attached in the second gear part holds the pivotable gear part in a center position. To this end a cam plate 5 with a ramp 6 is provided on the pivotable gear part, as well as a sensor element 7 on the flexible spring 4, by which the flexible spring 4 acts on the gear parts. On the top a mirror-symmetrical arrangement counteracts the rotation of the pivotable gear part in the opposite direction. For the rest, the cam plate 5 is formed of concentric cylinder jacket surfaces on two radii to the swivel axis of the gear part, which are spring-neutral, in the sense that the flexible spring 4 exercises no torque there on the pivotable gear part.

Figure 3:
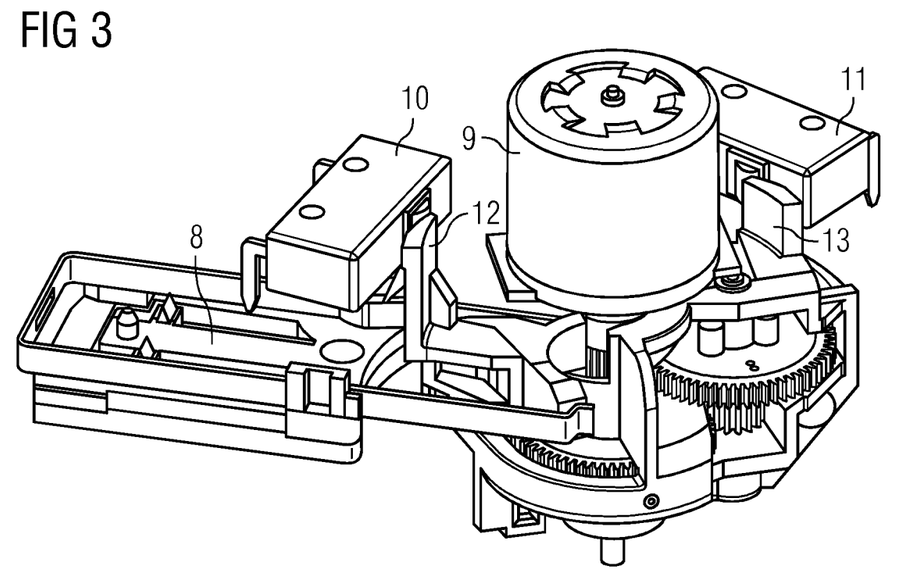
FIG. 3 is a perspective view that schematically shows the pivotable gear part according to FIG. 1, as well as the gear wheel elements connected thereto on the output side, the flexible spring, the pretensioning element, the switches and an electric motor.

In FIG. 3 a pretensioning element 8 has been added, as well as an electric motor 9 and switches 10, 11. These too belong to the second gear part. The pretensioning element 8 can, in order to adjust the spring force, be moved along the axis of symmetry of the flexible spring 4 and latched in several positions using a latching system. This adjustment facility could also be executed steplessly. The pretensioning element 8 permits a trimming operation in the final assembly, so that fluctuations in the spring force caused by tolerance fluctuations can be eliminated. As a result the tolerance band of the switching torque can be reduced. As soon as and as long as a switch 10, 11 is actuated by its respective cam 12, 13 of the pivotable gear part, the electric motor 9 switches off.

The contact area of each cam 12, 13 contains a ramp for actuating the buttons of the switches 10, 11. This actuation slightly increases the counteraction of the movement of the pivotable gear part shortly before and after the operating point is reached, when compared to the counteraction merely by the flexible spring 4. Downstream of the operating point the button springs of the switches 10, 11 no longer exert any torque on the pivotable gear part, because the cams 12, 13 are then designed to be spring-neutral on their respective ramp with concentric cylinder jacket surfaces.

Figure 4:
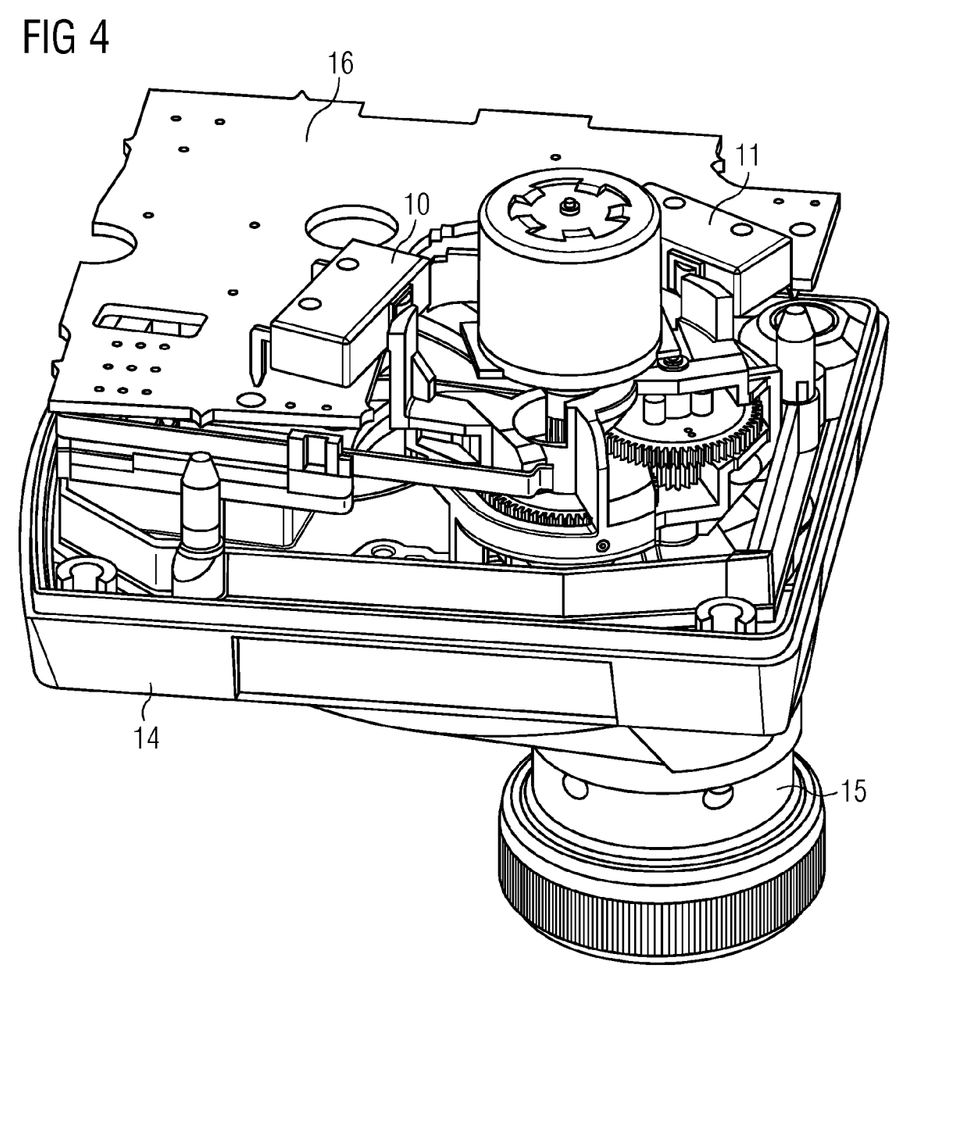
FIG. 4 is a perspective view that schematically shows the pivotable gear part according to FIG. 1, as well as the gear wheel elements connected thereto on the output side, the flexible spring, the pretensioning element, the electric motor, a lower housing part with the adjustment connection, the switches and an essentially unpopulated printed circuit board.
Figure 5:
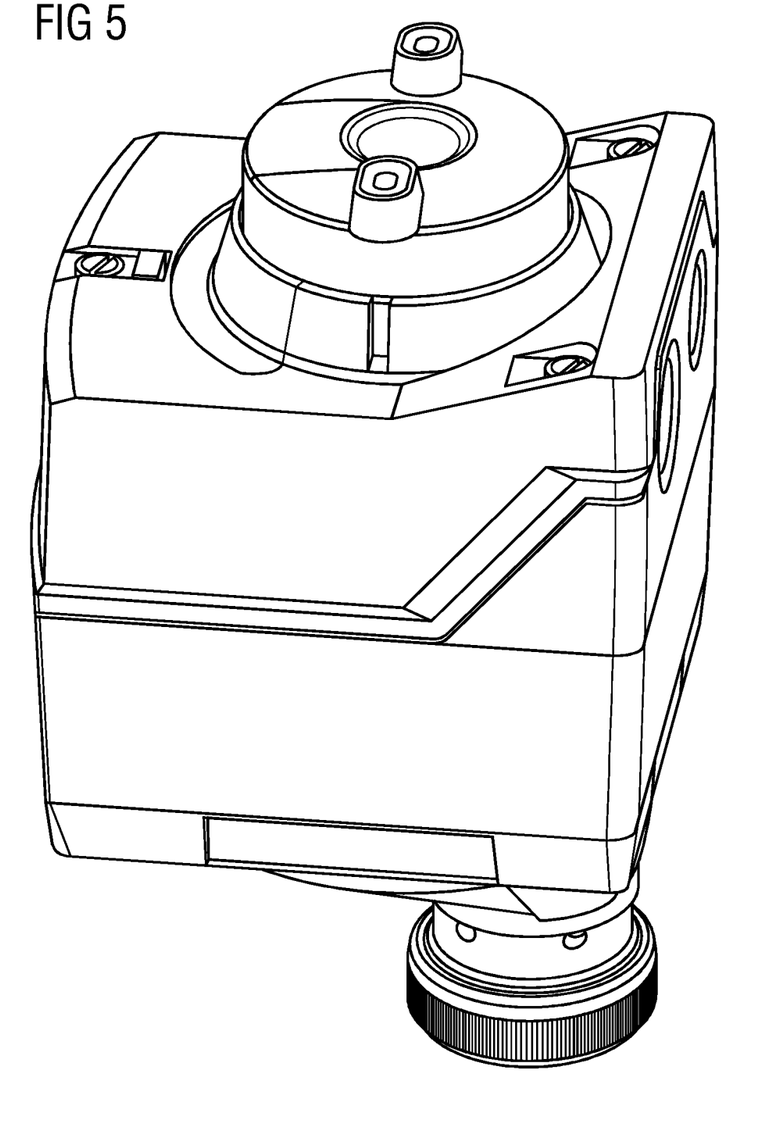
FIG. 5 is a perspective view that schematically shows the actuator.

FIG. 4 essentially shows the second gear part 14, which is formed by the lower part of the actuator housing. An adjustment connection 15 is also illustrated, in order to screw the actuator to a suitable valve and in operation to move its valve stem via a complementary connecting facility. A printed circuit board 16 supports the switches 10, 11, among other things. Most of its electrical components are not illustrated here.

Figure 6:
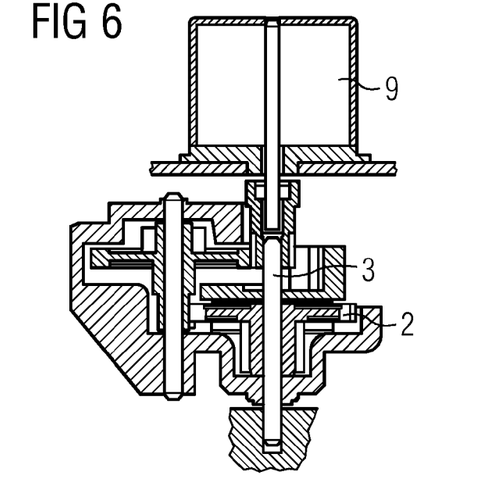
FIG. 6 is a cross section view of the pivotable gear part according to FIG. 1, as well as of the electric motor connected thereto on the input side and the gear wheel elements connected thereto on the output side.

FIG. 6 shows the first, pivotable gear part, as well as the electric motor 9, the gear wheel 2 and the axis of rotation 3 of the second gear part. The pivotable gear part pivots about the axis with which the axis of rotation 3 is aligned.

Figure 7:
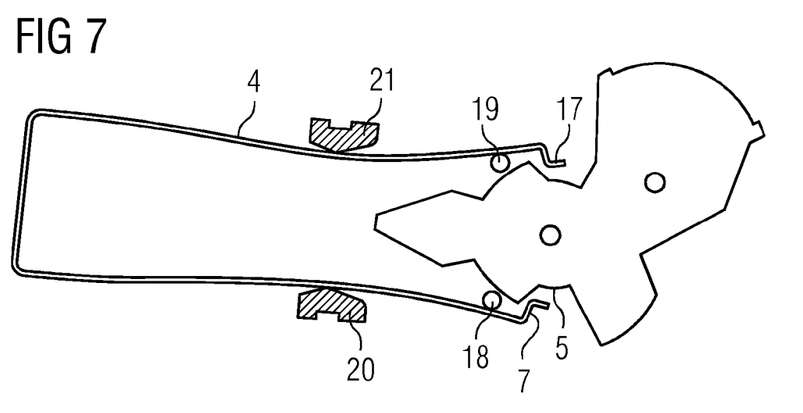
FIGS. 7, 8 and 9 are sketches of a cam plate of the pivotable gear part according to FIG. 1, the flexible spring, two cams of the pretensioning element and two cams of the second gear part.

In FIG. 7 the cam plate 5 of the pivotable gear part is in a center position. Accordingly the flexible spring 4 does not intervene and its sensor elements 7, 17 are even kept from touching the cam plate 5 by two expanding cams 18, 19 of the second gear part. The expanding cams 18, 19 primarily help with the assembly of the flexible spring 4, which otherwise would completely compress as a result of its pretensioning before the pivotable gear part is fitted. The pretensioning element contains two pretensioning cams 20, 21 which determine the effective bending length. Depending on where they are applied to the flexible spring 4 the pretensioning cams 20, 21 influence their effect on the pivotable gear part. Thus the pretensioning element is suitable for adjusting the counteraction against its movement out of the center position. Alternatively, separate pretensioning elements can be present for each of the pretensioning cams 20, 21. The pretensioning cams 20, 21 can in this way be moved independently of one another. Thus the effective bending length of the two spring arms, and thus the switching torque, can be adjusted independently of the direction of rotation.

Figure 8:
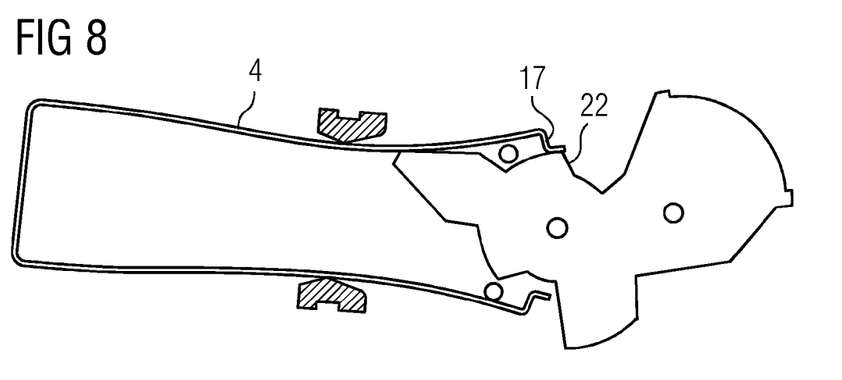

FIG. 8 shows how after one revolution of the pivotable gear part the sensor element 17 has now at the top of ramp 22 arrived at a concentric, and hence spring-neutral, section. Thus a particular torque on the pivotable gear part by the flexible spring 4 is terminated by sensor element 17 and ramp 22. In this situation one of the cams actuates its switch, resulting in the electric motor being switched off. Despite its low rotational resistance the deactivated electric motor normally prevents any movement. If nevertheless the pivotable gear part continues to rotate, it strikes against an inner side of the U-shaped flexible spring 4.

Figure 9:
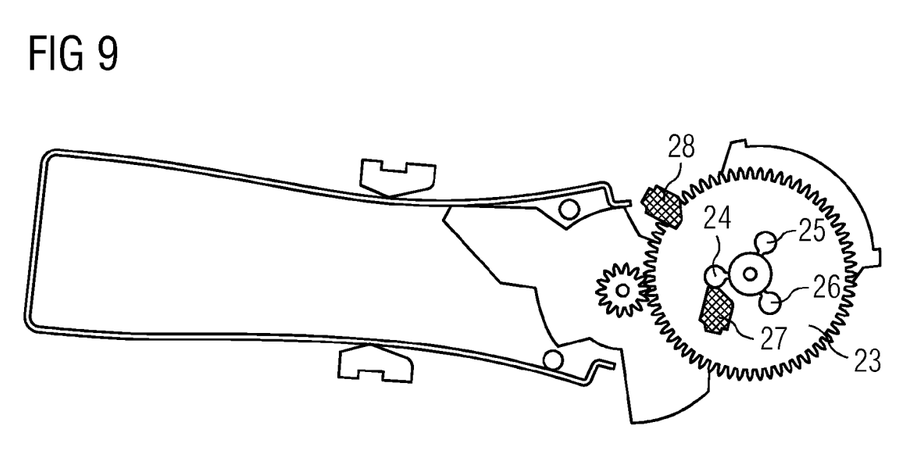

In FIG. 9 the pivotable gear part is still in the same state. A gear wheel 23 thereof is illustrated, to which release cams 24, 25, 26 are attached. As soon as the motor starts up again, the release cams 24, 25, 26 touch a release element 27, 28 of the second gear part. However, unlike the approach before switching off, when the motor was rotating in the other direction, the release cams 24, 25, 26 now do not strike the beveled side of the release element 27, but release cam 24 strikes its perpendicular contact area head-on. Following this pulse the pivotable gear part pivots as far as the ramp 22, on which as a result the flexible spring 4 acts on the pivotable gear part. This is followed by another movement of the pivotable gear part as far as the center position. In view of the small motor this large pulse contributes to the reliable release of the pivotable gear part from the deactivated position, although the small pulses do not significantly impede the approach before switching off when it is rotating in the opposite direction. Advantageously, for the purpose of attenuation, the material of the release elements 27, 28 is softer on its beveled contact areas than the rest of its material. The same optionally applies for the material of the release cams 24, 25, 26 on their sides touching these beveled contact areas.

Figure 10:
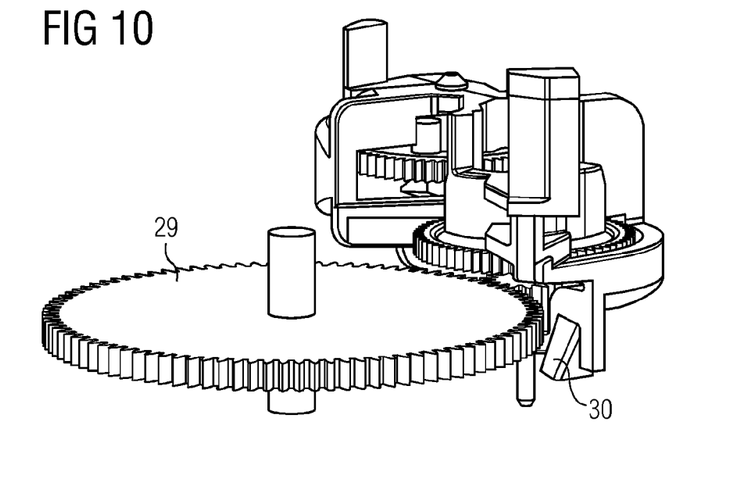
FIG. 10 is a perspective view that schematically shows the pivotable gear part according to FIG. 1, as well as gear wheel elements connected thereto on the output side.

In FIG. 10 a gear wheel 29 of the second gear part is moved downward when a manual actuator (not illustrated) is actuated. As a result, the motor is switched off via a switch (not illustrated) if it is running at this time. Likewise, gear wheel 29 is disengaged from its counterpiece in the pivotable gear part.

Figure 11:
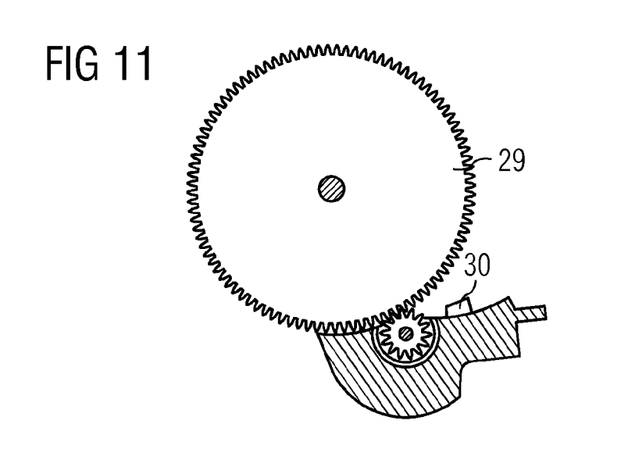
FIGS. 11 and 12 are sketches of a part of the pivotable gear part according to FIG. 1, as well as gear wheel elements connected thereto on the output side.
Figure 12:
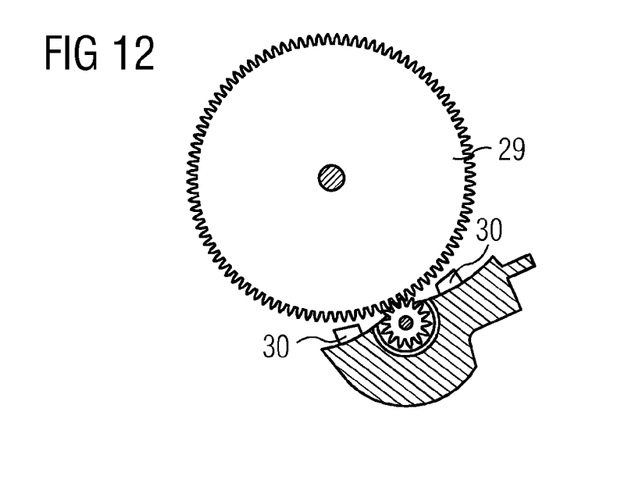

If the pivotable gear part is out of the center position, as illustrated in FIG. 11, ramps 30 serve, through contact with the gear wheel 29, to pivot the pivotable gear part again on course into the center position. As soon as a sensor element of the flexible spring acts on a ramp of the cam plate, this movement, aided by a spring, continues as far as the center position. In FIG. 12 the pivotable gear part is placed back in the center position.

Thus it is ensured that motor and manual actuator do not interfere with one another.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

What is claimed is:
1. An actuator, comprising:
   a motor; and
   a gear unit, including
      first and second gear parts having mutually interacting gear wheels, mutually movable by the motor out of an idle state of the gear unit to an operating point,
      a spring, acting on the first and second gear parts, counteracting movement out of the idle state of the gear unit, and
      at least one manual actuator that when actuated switches the motor off, disengages the mutually interacting gear wheels of the first and second gear parts and forces the first and second gear parts into the idle state,
      the first gear part having a cam plate, the second gear part having a sensor element for the cam plate, and the spring acting on the first and second gear parts during the movement out of the idle state in accordance with a position on the cam plate of the sensor element.
2. The actuator as claimed in claim 1,
   wherein the first gear part includes a gear wheel and a release cam,
   wherein the second gear part includes a release element, and
   wherein when the first and second gear parts move out of the idle state in a vicinity of the operating point, the release cam and the release element touch.
3. The actuator as claimed in claim 2,
   wherein the release element has a beveled contact area and a perpendicular contact area
   wherein when the gear wheel is rotating in a first direction, the release cam strikes the beveled contact area of the release element and when the gear wheel is rotating in a second direction, the release cam strikes the perpendicular contact area of the release element.
4. The actuator as claimed in claim 1, wherein the cam plate contains at least one spring-neutral path close to the ramp, on which no counteraction by the spring results.
5. The actuator as claimed in claim 1, wherein the cam plate contains at least one ramp, on which a maximum counteraction by the spring results.
6. The actuator as claimed in claim 5,
   wherein the first gear part includes a gear wheel and a release cam,
   wherein the second gear part includes a release element, and
   wherein when the first and second gear parts move out of the idle state in a vicinity of the operating point, the release cam and the release element touch.
7. The actuator as claimed in claim 5, wherein the sensor element is disposed at one end of the spring and contacts the at least one ramp during the movement out of the idle state.
8. The actuator as claimed in claim 6, wherein the sensor element is disposed at one end of the spring and contacts the at least one ramp during the movement out of the idle state.
9. The actuator as claimed in claim 8, wherein the sensor element is an integral portion of the spring.
10. The actuator as claimed in claim 9, wherein the sensor element is an integral portion of the spring.
11. The actuator as claimed in claim 5, wherein the cam plate contains at least one spring-neutral path close to the at least one ramp, on which no counteraction by the spring results.

12. The actuator as claimed in claim 11, wherein the sensor element is disposed at one end of the spring and contacts the at least one ramp during the movement out of the idle state.

13. The actuator as claimed in claim 12, wherein the sensor element is an integral portion of the spring.

14. The actuator as claimed in claim 11,
wherein the first gear part includes a gear wheel and a release cam,
wherein the second gear part includes a release element, and
wherein when the first and second gear parts move out of the idle state in a vicinity of the operating point, the release cam and the release element touch.

15. The actuator as claimed in claim 14, wherein the sensor element is disposed at one end of the spring and contacts the at least one ramp during the movement out of the idle state.

16. The actuator as claimed in claim 15, wherein the sensor element is an integral portion of the spring.

17. The actuator as claimed in claim 14,
wherein the release element has a beveled contact area and a perpendicular contact area
wherein when the gear wheel is rotating in a first direction, the release cam strikes the beveled contact area of the release element and when the gear wheel is rotating in a second direction, the release cam strikes the perpendicular contact area of the release element.

18. The actuator as claimed in claim 17, wherein the sensor element is disposed at one end of the spring and contacts the at least one ramp during the movement out of the idle state.

19. The actuator as claimed in claim 17, wherein the sensor element is an integral portion of the spring.

20. The actuator as claimed in claim 18,
wherein the release element has a beveled contact area and a perpendicular contact area
wherein when the gear wheel is rotating in a first direction, the release cam strikes the beveled contact area of the release element and when the gear wheel is rotating in a second direction, the release cam strikes the perpendicular contact area of the release element.

* * * * *